United States Patent [19]
Clanton

[11] Patent Number: 5,957,253
[45] Date of Patent: Sep. 28, 1999

[54] STATIONARY MOTORIZED POWER CORD REEL

[76] Inventor: Rocky Lee Clanton, 8110 B West Gate Blvd., Austin, Tex. 78745

[21] Appl. No.: 09/170,155

[22] Filed: Oct. 13, 1998

[51] Int. Cl.⁶ .................................................. H02G 11/00
[52] U.S. Cl. ........................................................ 191/12.2 A
[58] Field of Search ........................... 191/12 R, 12.2 R, 191/12.4, 12.2 A

[56] References Cited

U.S. PATENT DOCUMENTS

| | | | |
|---|---|---|---|
| 2,781,456 | 2/1957 | Buckeridge | 191/12.2 A |
| 4,047,599 | 9/1977 | Rousseau | 191/12.2 A |
| 4,108,264 | 8/1978 | Tanaka | 191/12.2 A |
| 4,825,986 | 5/1989 | Pepper | 191/12.2 A |
| 5,007,599 | 4/1991 | Forsyth | 191/12.2 A |
| 5,775,473 | 7/1998 | Cordero | 191/12.2 A |
| 5,810,135 | 9/1998 | Reilly et al. | 191/12.2 A |

*Primary Examiner*—Mark T. Le
*Attorney, Agent, or Firm*—Arnold White & Durkee

[57] ABSTRACT

An apparatus for winding a power cord from a floor. The power cord supplies power to a dependent device, such as a vacuum cleaner. The apparatus includes a spool, a traverse for winding and distributing the power cord onto the spool, a motor for driving the traverse, a floor rod for keeping the cord near the floor, and a remote control that couples power from the cord to the dependent device and that activates the traverse to reel the cord onto the spool.

14 Claims, 8 Drawing Sheets

STATIONARY MOTORIZED POWER CORD REEL

BACKGROUND—FIELD OF INVENTION

This invention relates to coiling and storing long power cords, specifically those cords required by maintenance equipment, such as industrial vacuums, to cover large floors.

BACKGROUND—DESCRIPTION OF PRIOR ART

Commercial maintenance companies are often contracted by businesses to clean their building when large equipment is required. However, even these commercial maintenance companies do not have a machine to efficiently handle the lengthy power cords, some reaching as over 100 feet, used to cover large areas.

Maintenance workers must stop work continuously just to get the cords out of the path of the equipment. The cords are bent, torn, knotted, and otherwise damaged because there has previously been no good way to manage the cords.

Previous attempts to solve this problem have yielded unsatisfactory results. One mechanism was designed to attach to the side of a unit of maintenance equipment and coil cord up inside itself. The problem with this device was that the equipment became difficult to maneuver and was thrown off balance as more cord was reeled in.

OBJECTS AND ADVANTAGES

Several objects and advantages of the Stationary Motorized Power Cord Reels are:

(a) to provide a means to coil long power cords in an organized manner with little or no effort performed by the operator;

(b) to provide a machine that is stationary so it does not roll over and damage the cord it reels in;

(c) to leave the dependent maintenance equipment free of extra weight that would render it cumbersome and off balance;

(d) to provide a storage unit for more cord length than the average piece of electrical equipment;

(e) to provide a machine that saves time and prevents undue physical exertion of the operator;

(f) to provide a machine that cleans the cord as it is reeled in;

(g) to provide a machine which will prevent knots and snags which may lead to costly replacements or repairs; and (h) to provide a machine which can be used with a variety of machines in various settings.

DRAWING FIGURES

In the drawings, closely related figures have the same number but different alphabetic suffixes.

SUMMARY

A power cord coiling and storage device designed to work in conjunction with another piece of machinery. The invention coils the power cord while the operator simultaneously does his work with the dependent equipment. The power cord delivers electricity to the dependent equipment and provides a means of controlling the invention.

Description—FIGS. 1 to 7

Figure 1:
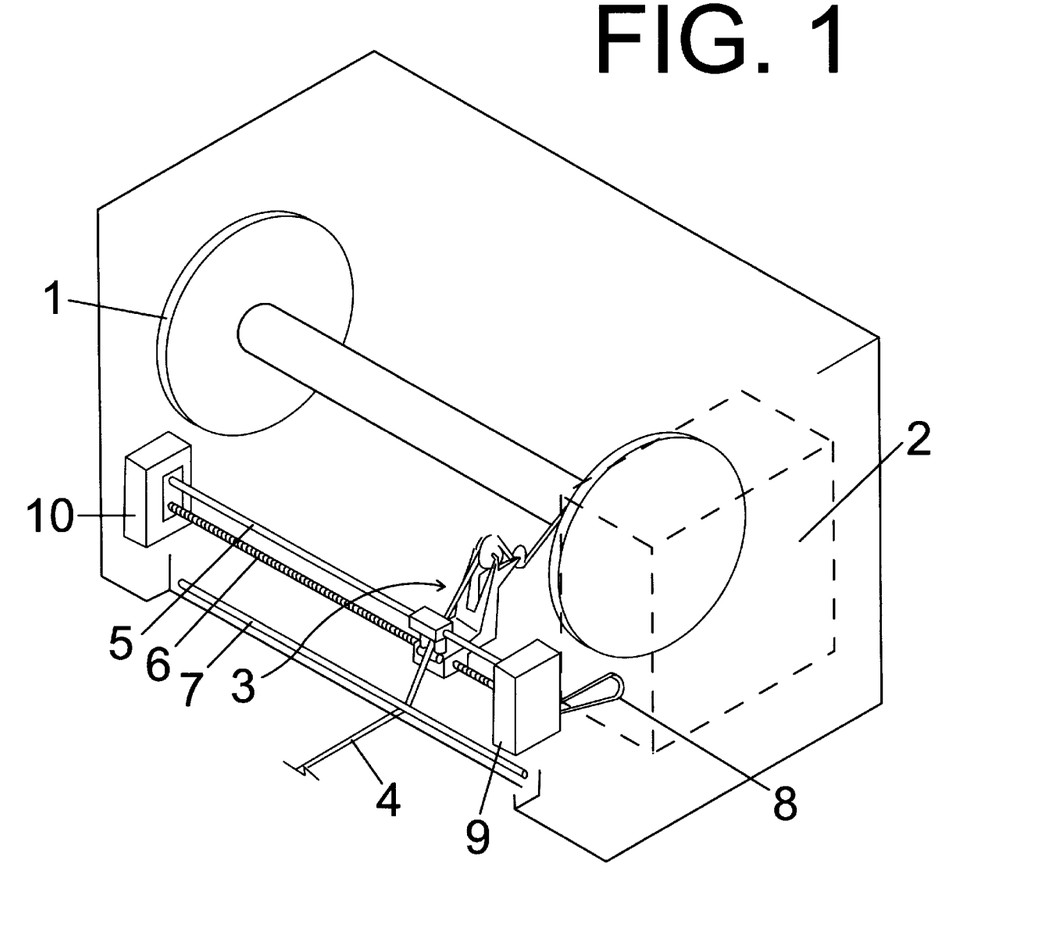
FIG. 1 shows the major interior workings of a winding apparatus according to the present disclosure including the spool, traverse, and power cord path of travel that are visible from the front and right sides.
Figure 2:
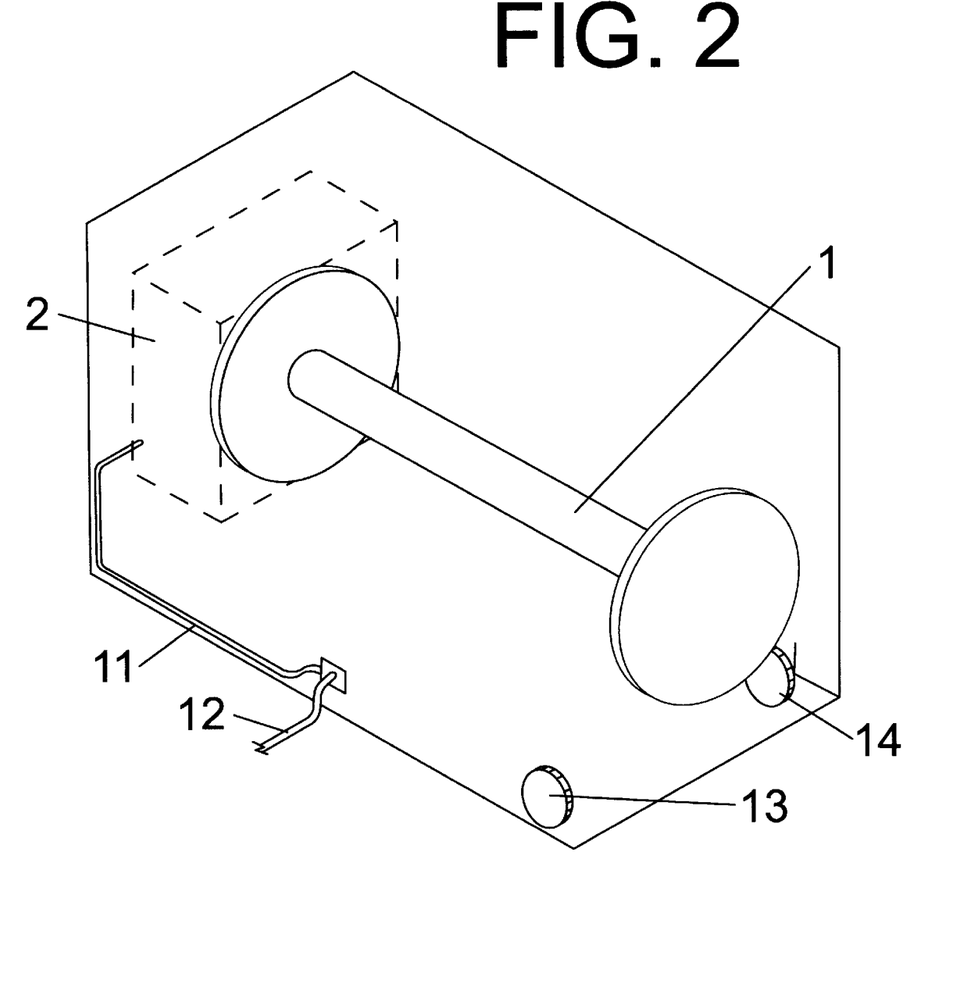
FIG. 2 shows the major interior workings of the invention including the spool and internal electric cord that are visible from the rear and left sides.

A view of the interior of a winding apparatus according to the present disclosure is illustrated in FIG. 1 front and right sides) and FIG. 2 (rear and left sides). The primary parts of the apparatus are a spool 1, a traverse 3, and a 1 horsepower motor 2. The spool is made of plastic or metal. The traverse is detailed in FIG. 3. The motor is standard and represented in the drawings only as a space allotted to the motor. A straight metal traverse rod 5 and a spiral metal traverse rod 6 hold the traverse and are located between an exterior wall and the spool. At the bottom of the exterior front wall is a straight metal floor rod 7. A right traverse endcap 9 and a left traverse endcap 10 are located at respective ends of the traverse rods. A rubber traverse drive belt 8 connects the motor to the spiral metal traverse rod. Also illustrated is a path of travel of the custom power cord 4 into the machine, through the traverse, and onto the spool.

The custom power cord 4 is a round heavy-duty rubber cord. In the cord are four wires. Two wires are dedicated to supplying power to the end-user machine, a vacuum, for example. They are of the gauge and composition of usual commercial strength power cords. The other two wires connect the trigger 29 (see FIG. 4B) to the operation of the motor.

FIG. 2 illustrates a master power supply external cord 12 which lead from a power outlet to the winding apparatus and a master power supply internal cord 11 which leads from the exterior wall of the invention to the motor. Two wheels 13/14 are located on the left interior of the invention. They are standard metal and rubber wheels and are represented in the drawings as space provided for them.

Figure 3:
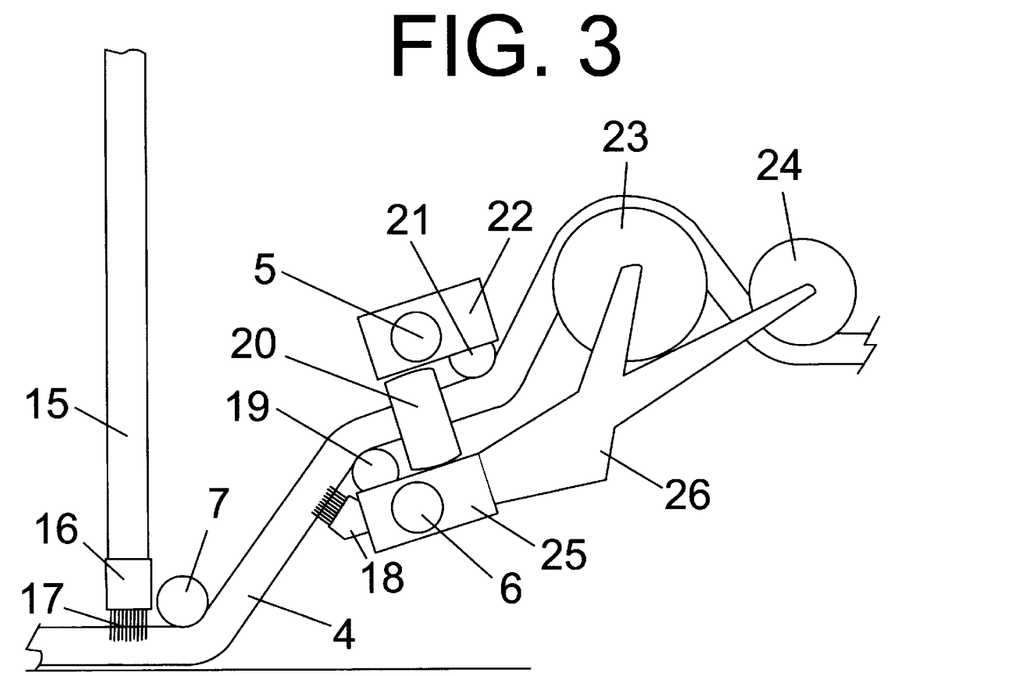
FIG. 3 shows a detail of the traverse and the path of travel of the power cord through the traverse seen in FIG. 1.

FIG. 3 shows a detail of the traverse and illustrates a path of travel of the power cord through the traverse. The front exterior wall 15 is represented and the custom power cord enters from the left and exits to the spool on the right side of the drawing. A metal floor cord brush 16 hold the bristles 17 in place and is located at the bottom of the exterior wall. Just behind the brush is the straight metal floor rod 7. On the traverse itself is a traverse cord brush 18, a lower horizontal roller 19, two vertical rollers 20, an upper horizontal roller 21, a large tension wheel 23, and a small tension wheel 24. The rollers are composed of hard rubber or metal. There are two vertical rollers though only the right roller is visible in this drawing. The tension wheels are hard plastic or metal. A tension wheel assembly 26 made of metal or hard plastic supports the tension wheels. An upper traverse housing 22 which is attached to the straight metal rod and a lower traverse housing 25 which is attached to the spiral metal rod are made of metal or plastic.

Figures 4A, 4B:
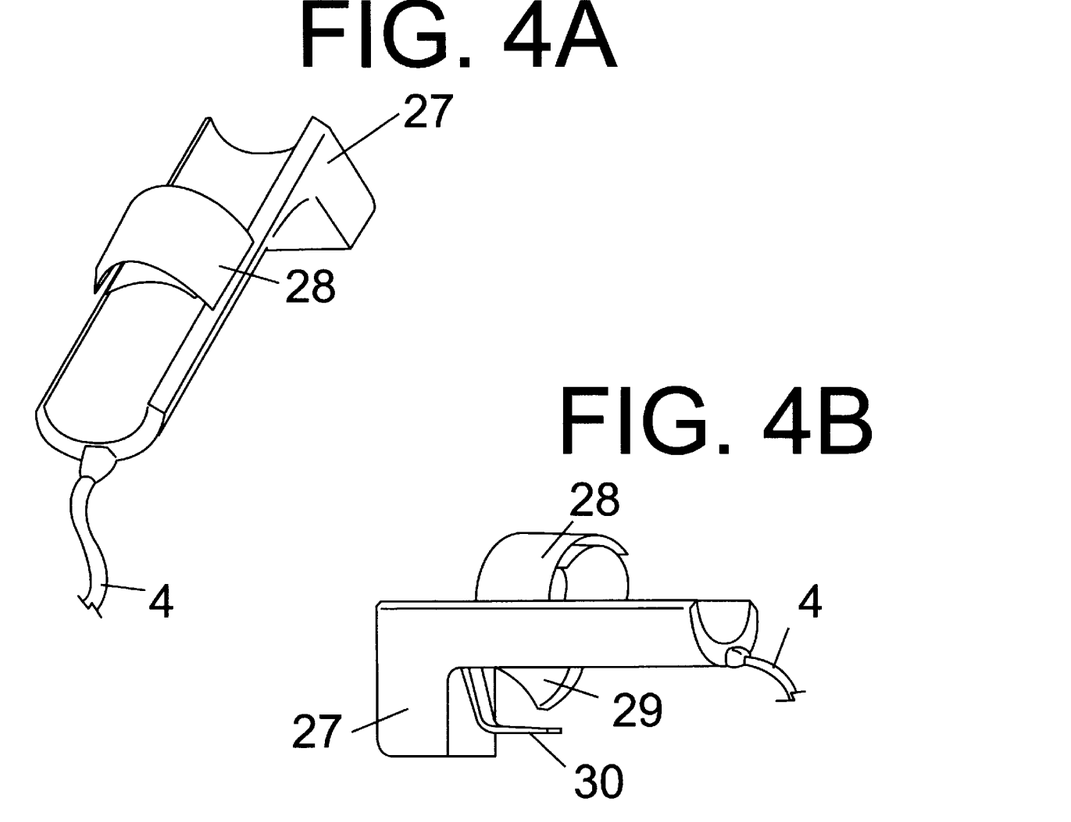
FIGS. 4A–4C show various aspects of a remote control according to the present disclosure.

FIG. 4A shows the top, right, and rear sides of a remote control 27 made of metal or plastic. The custom power cord attaches to the rear of the remote. A Velcro strap 28 made of rubber or nylon with a rubber interior surface is attached to the top of the remote control. A snap or buckle may be substituted for Velcro as a means to secure the strap around a machines handle.

FIG. 4B shows the left side and rear of the remote. A trigger 29 is located on the bottom of the remote and is made of plastic. A trigger guard 30 extends from the bottom of the remote and over the trigger and is made of the same material as the remote.

Figure 4C:
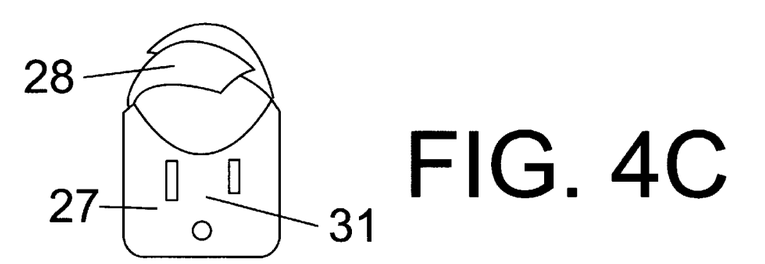

FIG. 4C shows the from side where plug holes 31 are located.

Figure 4D:
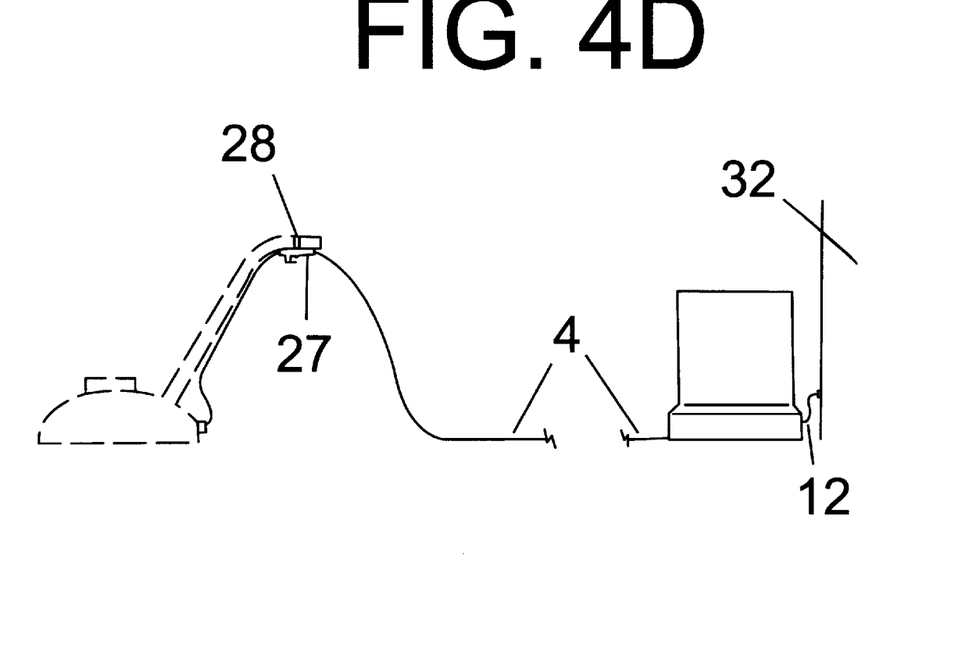
FIG. 4D shows a winding apparatus according to the present disclosure (main body, power cord, and remote) in relation to a piece of maintenance equipment and a wall.

FIG. 4D illustrates the inventions various parts, its exterior, customer power cord, and remote control, in relation to a given piece of equipment and a wall of a room 32.

Figure 5:
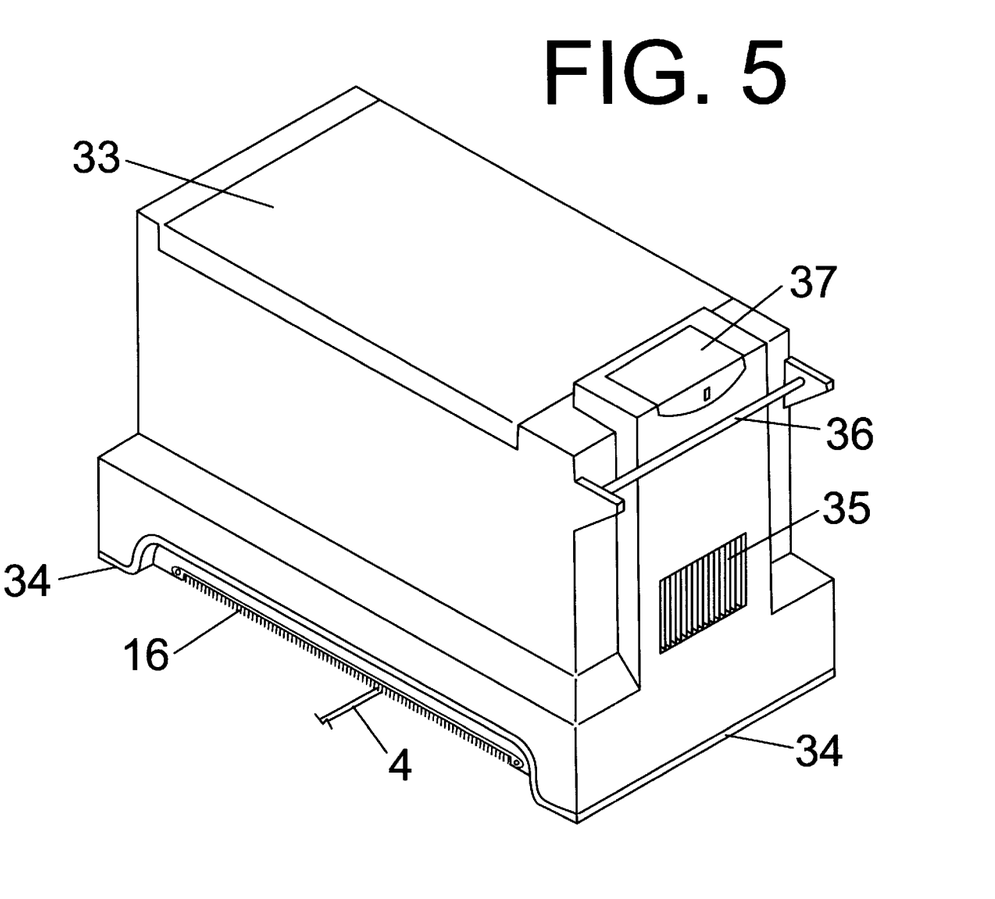
FIG. 5 shows an exterior from the front and right sides with a top control panel, pull bar, and exterior cord brush.

FIG. 5 shows front and right side exterior views. The right side is the short side with a pull bar 36. A control panel lid 37 and a ventilation grate 35 can be seen. A rubber footing 34 runs around the base of the exterior. Composing most of the top is a top access lid 33. In this illustration the floor cord brush 16 can be seen. There are various possibilities with the exterior of the winding apparatus as long as the basic operation is not affected. For example, the control panel can be located in any convenient part of the machine.

Figure 6:
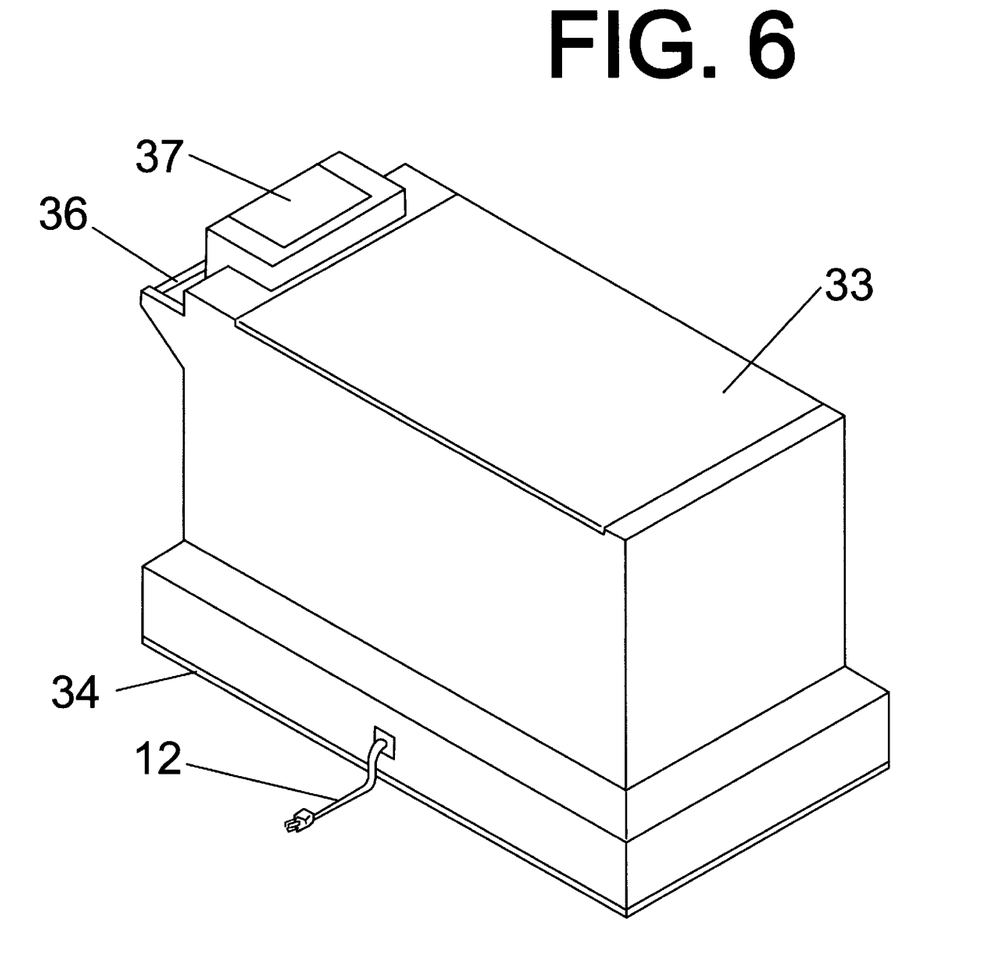
FIG. 6 shows an exterior from the rear and left sides including the master power cord.

FIG. 6 shows the rear and left sides of the exterior. The master power supply exterior cord 12 can be seen.

Figure 7:
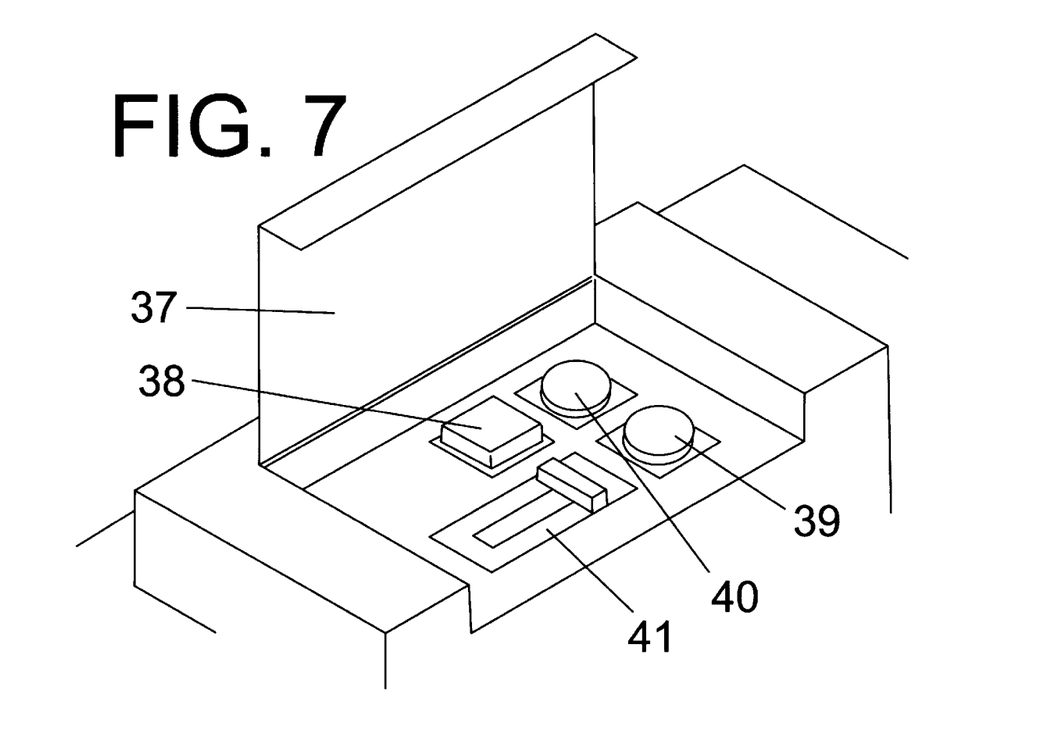
FIG. 7 shows a control panel.

FIG. 7 illustrates the control panel lid 37 when open and revealing a power on button 40, an power off button 39, a clutch control 41, and a reel-in button 38.

Operation—FIGS. 1 to 7

The basic operation of a winding apparatus according to the present disclosure is performed by the spool 1 pulling the custom power cord 4 onto itself. The correct operation of the winding apparatus is as follows. The operator will position the winding apparatus next to a power outlet on a wall in the room or within the power cord's reach of the place electricity is required. The operator will lower the machine to the floor so that the rubber footing 34 is touching the floor. The wheels are able to retract upwards into the machine. He/she will connect the master power supply external cord 12 to the wall and power on the machine. The clutch will be released using the clutch control 41 and the custom power cord 4 will be pulled out of the machine to the desired location. The remote control 27 is attached to the end of the power cord. The remote is strapped to the handle of the equipment to be used, a vacuum, for example. The vacuum's own power cord is plugged into the end of the remote via the plug holes 31. The operator engages the clutch on the winding apparatus and closes the control panel lid.

As the operator vacuums he/she will move closer and closer to the winding apparatus using the trigger to control the invention and reel in the power cord. This enables the operator to continue his/her work without stopping to move the cord out of the way or coil it up. The cord is reeled in and out of the path of the vacuum by a squeeze on the trigger.

FIGS. 1 and 3 illustrate the path of travel of the power cord. As the spool reels in the cord, the cord enters through the bottom passing through the bristles of the floor cord brush 16 which clean dirt and debris from the cord. The cord is pulled under the straight metal floor rod 7 which keeps the cord from grinding up on the bristles and wearing them out. Note that the cord is kept in contact with the floor until it enters the machine. This helps prevent passers-by from tripping on the cord. The cord is pulled over the lower horizontal roller 19 passing through the bristles of the traverse cord brush 18 which further clean the cord. It passes between the vertical rollers 20 and then under the upper horizontal roller 21. It then passes over the large tension wheel 23 and under the small tension wheel 24. From here it is reeled onto the spool. The purpose of rollers is to guide the cord onto the tension wheels and the tension wheels ensure that the cord does not become tangled during normal start-and-stop operation of the machine.

The traverse glides back and forth on the straight metal rod 5 and the spiral metal rod 6. The motor turns the traverse drive belt 8 which in turn spins the spiral rod. As the rod spins, the traverse moves back and forth because of its complementary spiral fitting in the lower traverse housing 25. The overall purpose of the traverse is to distribute the power cord evenly across the spool while preventing tangles.

Conclusions, Ramifications, and Scope

The stationary motorized power cord reel was created to solve the problem often experienced by maintenance workers and others who must handle long power cords and cables to operate equipment usually in an industrial or commercial setting. The need to cover large areas results in the tangling and tearing of expensive power cords, lost time to handle the cords, and ultimately physical stress on the operator. The winding apparatus seeks to solve these problems.

The winding apparatus is mobile, one machine can be used in a variety of settings, but is stationary while in operation. It is to be placed next to a power outlet where it remains for the extent of its use. The power cord, stored on an internal spool, is extended as far as the operator needs it. Once attached to the device which the operator intends to use (not part of the winding apparatus) the operator will perform his work and use a remote to reel in the power cord as he or she progresses. Once an entire area has been completed, the operator has returned to the unit and the power cord is completely reeled in. Unplug the unit from the outlet and it is ready to be moved to the next job.

Figure 4E:
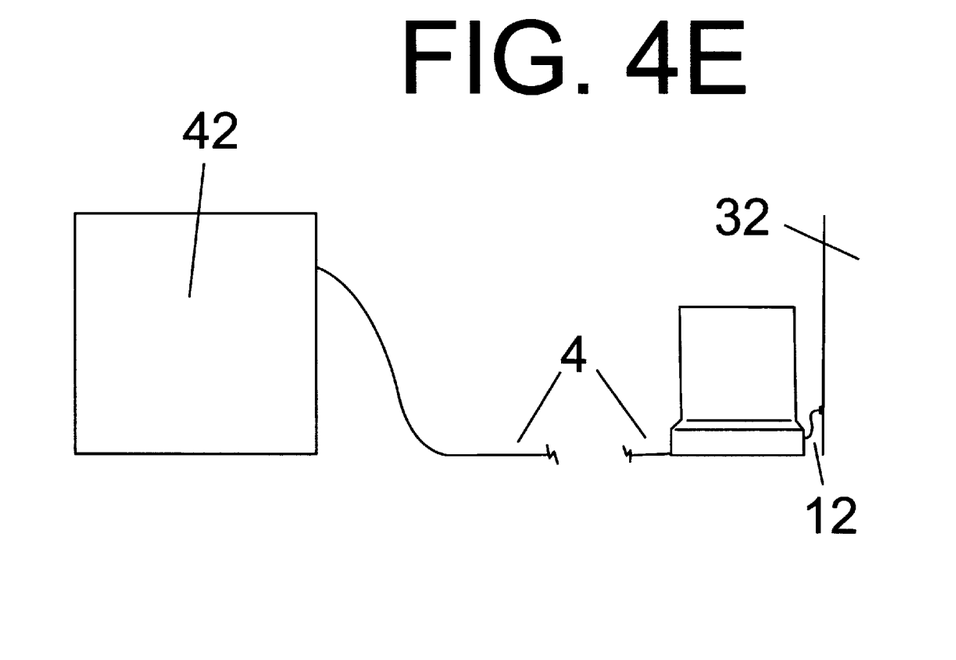
FIG. 4E shows a winding apparatus according to the present disclosure in connection with an electrical device.

Dependent device or electrical device 42 connected to and powered through the winding apparatus of the present invention, as shown in FIG. 4E, is not limited to industrial maintenance. The winding apparatus may be adapted to television studios where camera pedestals run over their own power cords so often a production assistant is assigned just to move cords out of the way. Large lighting rigs for movie sets or construction purposes would benefit from the advantages of the winding apparatus described herein. A smaller version of the winding apparatus may be adapted for home use with vacuums, weed-whackers, and other electric devices.

I claim:

1. An apparatus for winding a power cord from a floor, the power cord supplying power to a dependent device, said apparatus comprising:

a spool;

a traverse in operative relation to said spool and configured to wind and distribute said cord onto said spool by moving longitudinally with respect to said spool;

a motor coupled to said traverse and configured to move said traverse longitudinally with respect to said spool;

a floor rod in operative relation to said traverse and configured to secure at least a portion of said cord adjacent said floor; and a remote control coupled to said cord and configured to couple power from said cord to said dependent device, said remote control configured to activate said traverse to reel said cord onto said spool.

2. The apparatus of claim 1, wherein said traverse comprises an upper and lower traverse housing, and wherein said apparatus further comprises:

a traverse rod coupled to said upper traverse housing;

a spiral traverse rod coupled to said lower traverse housing and to said motor; and wherein said lower traverse housing is configured to engage said spiral transverse rod to move said traverse longitudinally with respect to said spool.

3. The apparatus of claim 2, further comprising a traverse drive belt connecting said motor to said spiral traverse rod.

4. The apparatus of claim 1, further comprising a floor cord brush coupled to said floor rod and configured to clean said cord during winding.

5. The apparatus of claim 1, further comprising a traverse cord brush coupled to said traverse and configured to clean said cord during winding.

6. The apparatus of claim 1, further comprising a tension wheel coupled to said traverse and a roller coupled to said traverse, wherein said wheel and roller are configured to direct said cord onto said spool.

7. The apparatus of claim 1, further comprising a housing for enclosing said spool and a retractable wheel coupled to said housing.

8. The apparatus of claim 1, wherein said remote control comprises a strap configured to secure said remote control to said dependent device.

9. The apparatus of claim 8, wherein said strap comprises a fastener.

10. The apparatus of claim 1, wherein said remote control comprises a trigger and a trigger guard, said trigger configured to allow single hand operation of said dependent device and said apparatus.

11. The apparatus of claim 1, wherein said dependent device comprises industrial maintenance equipment, a vacuum cleaner, a television camera, a light, or a weed trimmer.

12. An apparatus for winding a power cord from a floor, the power cord supplying power to a dependent device, said apparatus comprising:

a spool;

an apparatus housing having an upper and lower side;

a traverse including an upper and lower traverse housing, said traverse in operative relation to said spool and configured to wind and distribute said cord onto said spool by moving longitudinally with respect to said spool;

a traverse rod coupled to said upper traverse housing;

a spiral traverse rod coupled to said lower traverse housing;

a spiral fitting defined by said lower traverse housing and configured to engage said spiral transverse rod to move said traverse longitudinally with respect to said spool;

a motor coupled to said traverse and to said spiral traverse rod, said motor configured to move said traverse longitudinally with respect to said spool;

a floor rod in operative relation to said traverse and positioned adjacent said lower side of said apparatus housing, said floor rod configured to secure at least a portion of said cord adjacent said floor;

a floor cord brush coupled to said floor rod and configured to clean said cord during winding; and a remote control coupled to said cord and configured to couple power from said cord to said dependent device, said remote control configured to activate said traverse to reel said cord onto said spool.

13. The apparatus of claim 12, further comprising a traverse cord brush coupled to said lower traverse housing and configured to clean said cord during winding.

14. The apparatus of claim 12, further comprising:

an access lid coupled to said upper side of said apparatus housing;

two retractable wheels coupled to said lower side of said apparatus housing; and a pull handle coupled to said apparatus housing.

* * * * *